United States Patent [19]

Lovitt

[11] Patent Number: 4,498,421
[45] Date of Patent: Feb. 12, 1985

[54] SELF-CLEANING CAGE

[75] Inventor: Robert O. Lovitt, Katy, Tex.

[73] Assignee: Michael Douglas Fredrick, Houston, Tex.

[21] Appl. No.: 399,832

[22] Filed: Jul. 19, 1982

[51] Int. Cl.³ .......................... A01K 1/03; A01K 1/01
[52] U.S. Cl. .......................................... 119/17; 119/29
[58] Field of Search .......................... 119/17, 18, 22, 29

[56] References Cited

U.S. PATENT DOCUMENTS

| 934,075 | 9/1909 | Kaneaster | 119/22 |
| 1,125,597 | 1/1915 | Roegner | 119/22 |
| 3,718,120 | 2/1973 | Schwarz et al. | 119/29 |
| 3,830,201 | 8/1974 | Coulbourn | 119/17 |
| 3,978,819 | 9/1976 | Lovitt | 119/17 |

FOREIGN PATENT DOCUMENTS 387456 2/1933 United Kingdom .................. 119/17

*Primary Examiner*—Robert P. Swiatek
*Attorney, Agent, or Firm*—Wofford, Fails & Zobal

[57] ABSTRACT

An improvement in a cage for small animals or the like having a perforate bottom to allow wastes to be dropped by gravity exteriorly of the cage, a continuous periphery of walls, and a top, characterized by a continuous belt traversing beneath the perforate bottom and contiguous to a scraper and waste collector, and through a cleaning pan adjacent steam-cleaning passageways for cleaning. The belt has motive apparatus comprised of a plurality of gears and belt moving roller connected to an animal-powered wheel to move the belt when the animal runs or walks in the wheel. Also disclosed are specific preferred embodiments including having one of the gears in a gear train movable responsive to movement of a fulcrum lever to disengage the belt from the animal wheel; and having a supplemental belt moving apparatus to move the belt as desired.

7 Claims, 3 Drawing Figures

SELF-CLEANING CAGE

Field of Invention

This invention relates to care and maintenance of animals, such as rodents, for pets, research purposes, and the like. More particularly, it relates to self-cleaning cages and accessories facilitating the daily care and training or showing of the animals, as to a group of children.

Description of the Prior Art

It is important in research that animals being treated be maintained in a sanitary condition, since the results of the research often depend upon the prevention of the spread of disease among the animals. Such illness or death of the animals from extraneous causes could nullify a research project. Moreover, in psychology classes, or simply in demonstration to children or the like, it is desirable to have clean cages that are not foul smelling. In addition, it is helpful if various mechanical principles, along with psychological principles and learning principles, can be demonstrated by the use of an appropriately designed cage for the small animals, such as rodents or the like.

Cages for these small animals have been made partially of metal heretofore. Rodents frequently gnaw on the exposed portions of their cages or drinking nozzles and such cages cause ingestion of metal or the oxides of metal to interfere with results of tests, particularly in nutritional experiments.

A wide variety of different types of cages have been proposed, including pans beneath the cages with rotary scrapers, permeable bottom cages with absorbent paper that can be periodically pulled forward and disposed of, droppings on a belt having a rewind cable, egg collecting belts, perforate bottoms, experimental cages with electrical connectors for monitoring movement and cages with laterally movable catch sheets of polyethylene or the like. Automated water delivery systems have been proposed.

In U.S. Pat. No. 3,978,819, issued Sept. 7, 1976, entitled "Cage and Accessories Therefor", I disclosed an improved cage having a battery with a plurality of cages and a belt that could be moved beneath all of the cages, as well as disinfectant pan and particular types of drinking nozzles and water-holding apparatus to obviate a portion of the problem.

Even therein, it can be seen that there was relatively little opportunity to demonstrate physical principles of rotary motion, lever arms and fulcrum points and to show how an animal could propel its belt and effect a self-cleaning cage.

SUMMARY OF THE INVENTION

Accordingly, it as an object of this invention to provide an improved cage that obviates the disadvantages of the prior art and facilitates care of small animals in cages, cleaning of the cages, and demonstrating physical principles at the same time.

Particularly, it is an object of this invention to provide an improved cage that rids the cage of wastes by the small animal therein without exposing to other occupants of cages, that allows sanitary cleaning automatically and that allows demonstration of physical principles or that facilitates cleaning as desired.

These and other objects will become apparent from the descriptive matter hereinafter; more particularly when taken in conjunction with the appended drawings.

In accordance with this invention, there is provided an improvement in a cage for small animals or the like, having a perforate bottom to allow wastes to be dropped by gravity exteriorly of the cage, a plurality of walls about the cage, a top, viewing means for viewing interiorly of the cage. The improvement is characterized by:

a. a continuous closed-loop belt with a portion traversing underneath the perforate bottom to catch the wastes dropped therethrough, the belt traversing over a plurality of rollers beneath the portion and constraining the belt to pass contiguously to a scraper interiorly of a cleaning pan for cleaning;

b. scraper and waste collector disposed adjacent the belt upstream of the pan so as to scrape wastes from the top surface of the belt before it traverses the cleaning pan;

c. cleaning pan disposed downstream of the scraper and adapted to receive liquids condensed on and falling from the belt, the cleaning pan having a drain for draining off the liquids;

d. steam-cleaning passageways traversing laterally across the belt interiorly of the cleaning pan for cleaning the belt such that liquids will collect in the cleaning pan;

e. motive means for moving the belt such that its top surface passes beneath the perforate bottom and contiguously to the scraper and through the cleaning pan adjacent the steam-cleaning passageways. The motive means includes an animal-powered wheel suspended accessibly to the animal and journalled for rotation responsive to locomotion of the animal, and transducing means for translating the rotary motion of the wheel into movement of the belt. In a preferred embodiment, the transducing means includes a gear train with one of the gears movable so as to interrupt the train and allow harnessing the wheel to the belt or not as desired. In a preferred embodiment, the gear that is movable to interrupt the train, is connected to a fulcrum lever that is pivoted about a fulcrum shaft that is movable to a plurality of points to demonstrate the physical principles of lever arms. A supplemental motive means is employed for moving the belt as desired. A signalling means is provided for enabling stimulating the animal for teaching and learning sessions.

Description of the Preferred Embodiment(s)

Figure 1:
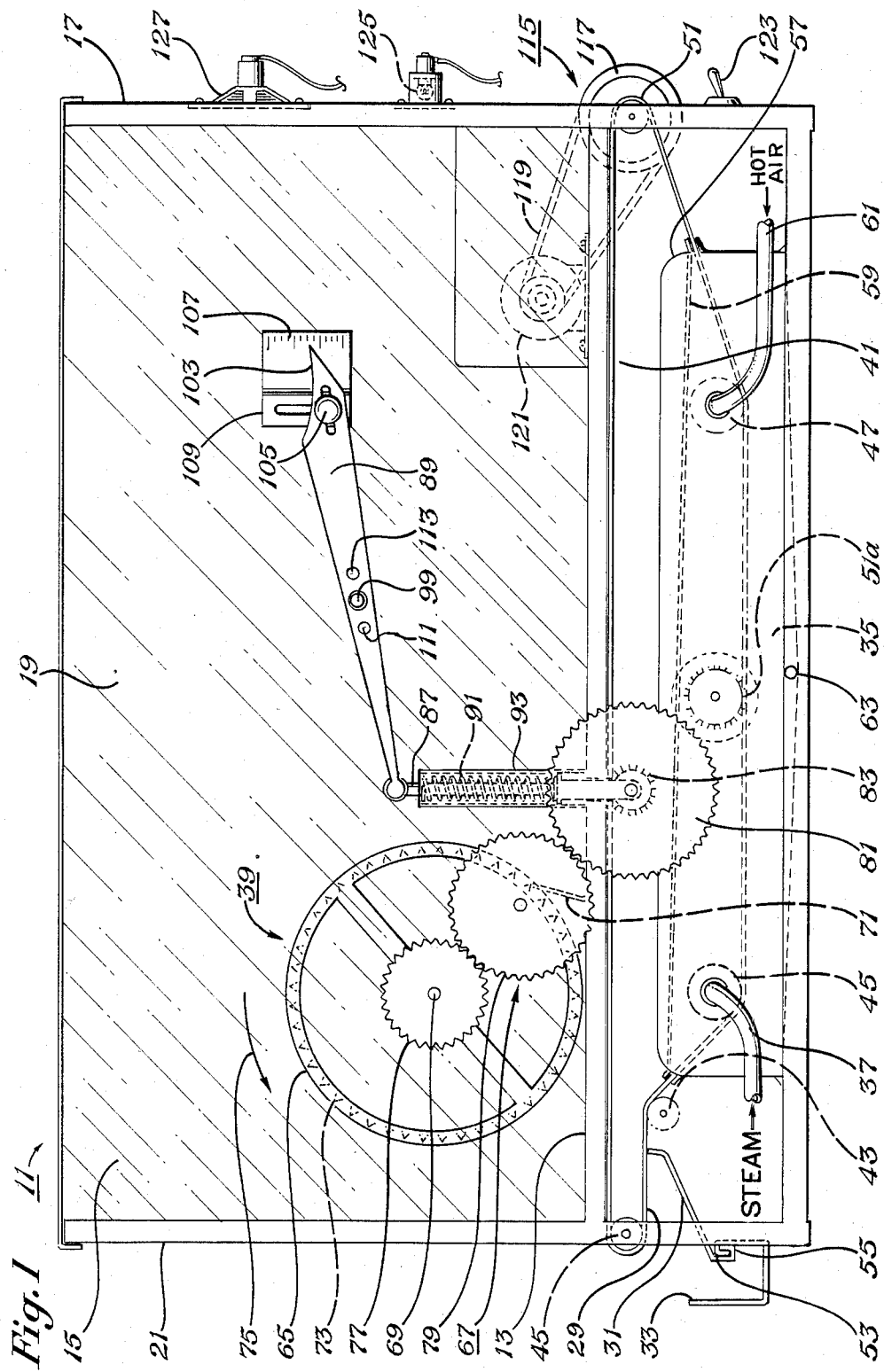
FIG. 1 is a side elevational view of the cage in accordance with one embodiment of this invention.
Figure 2:
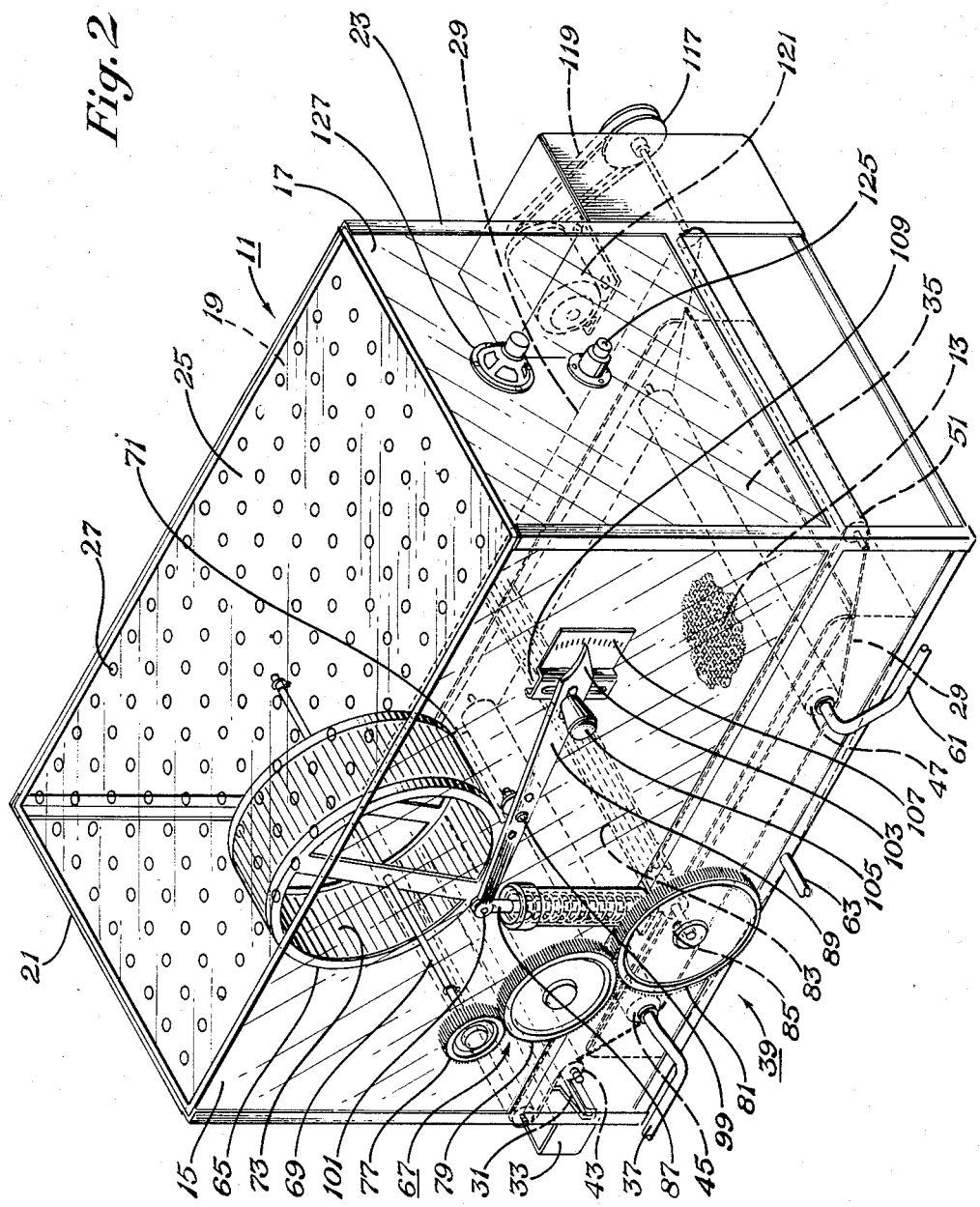
FIG. 2 is an isometric view of the cage of FIG. 1.

FIGS. 1 and 2 illustrate a cage 11 in accordance with one embodiment of this invention. The cage 11 has a perforate bottom 13 such as provided by a wire-like grid structure. The perforate bottom allows the waste material, such as droppings, urine, and the like to fall through the bottom by means of gravity. The bottom 13 is connected with four upstanding walls 15, 17, 19, 21. If desired, at least two of the upstanding walls, such as ends 17, 21, may be formed of the same foraminous structure as the bottom 13, whether it be wire-like grid structure, perforate plastic, or the like. Similarly, the side 19 may be formed of the same perforate structure, if desired. As illustrated, however, the sides 15 and 19 are formed of clear plastic. Respective pairs of apertures (not shown) may be formed in one or more of the sides to hold drinking apparatus such as disclosed in the aforementioned U.S. Pat. No. 3,978,819. The descriptive matter of that patent is incorporated herein by reference for the details that are omitted herefrom.

The respective joints of the cage as at the corners, bottoms of the walls, and the like, may be formed by any simple structure, as by U-shaped channels with the perforate structure inserted therebetween and held in place by suitable means, as is conventionally done. Conventional means include adhesion by plastic, such as epoxy resin, screws or nuts and bolts. The flanges 23 may be integrally formed with the tops of the sides, ends, and bottom such that they readily support the weight of the cage, occupant, water bottles, and other accessories described in more detail hereinafter. As illustrated, the walls are of clear plastic to facilitate viewing the interior of the cage 11. A top 25, or lid, is provided. As illustrated, the top 25 has perforations 27 to facilitate circulation of air through the cage.

The cage 11 also includes the improvement comprising a belt 29, scraper 31, waster collector 33, cleaning pan 35, steam-cleaning passageways 37, and motive means 39 for moving the belt.

The belt 29 is a continuous closed-loop belt with a portion 41 traversing beneath the perforate bottom 13 for collecting, or catching, the wastes dropped through the perforated bottom. The belt traverses over a plurality of rollers 43, 45, 47, beneath the portion 41 and constraining the belt to pass contiguously to the scraper 31 and interiorly of the cleaning pan 35 for cleaning.

The belt may have ends joined by several means such as conventional belt staples in each end of the belt with a rod intermediate the overlapping ends of the staples, sewed together with a suitable strong material or be preformed. The belt may comprise a single thickness of material. It is preferable, however, that the belt comprise a flexible material that can be steam cleaned readily without harm. A cleaning or disinfecting solution may be employed in the pan in conjunction with the steam-cleaning. If a disinfectant pan is used, not shown, it is preferable that the belt be able to withstand the disinfectant. If desired, a belt such as described in U.S. Pat. No. 3,978,819 may be employed. In order to effect the desired traversal of the belt, end idler roller 45 is journalled for rotation similarly as are the rollers 43, and 47. A power roller 51 is connected with a supplemental motive means as described later hereinafter for effecting movement of the belt as desired. The power roller 51 can be at the end of the cage 11 as shown and/or in the pan 35, as shown in dashed lines 51a, FIG. 1.

The scraper 31 comprises a blade with a scraper edge that engages the "top surface" of the belt 29. By "top surface" is meant the surface that is on top in traversing beneath the cage. The scraper edge thus scrapes the wastes from the surface of the belt before the belt surface becomes inverted or on the bottom, during the traversal over the rollers and through the cleaning pan 35. Scraper 31 may take the same shape as described in U.S. Pat. No. 3,978,819, with a scraper edge and a biasing to engage the edge with the belt. The scraper slopes downwardly to deposit the wastes in the waste collector 33.

The waste collector 33 is disposed beneath the scraper 31 to catch the wastes that are scraped from the belt 29. The waste collector 33 may comprise any pan, metallic, plastic, or celluloid.

As illustrated, it has a lip 53 that can be hung on the lower lip 55 of the scraper 31. The waste collector 33 is, thus an elongate pan. The waste collector 33 may be removed by simple upward and outward motion to disengage from the supporting lip. It is installed by the converse motion. If desired, it could be inserted by any other means; for example, slid along runners or the like. The lateral dimensions of the waste collector 33 are as small as feasible to still ensure catching of the waste from the scraper 31 before the belt passes into the cleaning pan 35.

The cleaning pan 35 may comprise a single pan or a plurality of pans with different types of solutions. For example, it may comprise the types of dual pans described in U.S. Pat. No. 3,978,819, in which a first pan has a surfactant solution and a second pan has a disinfectant solution. On the other hand, a single pan may employ both surfactant and disinfectant. Very typical of the surfactants are the anionic, cationic, or nonionic surfactants, since the belt does not come in direct contact with any of the animals. Consequently, there is no need for being concerned about carcinogenic surfactants or free radicals, and a surfactant such as petroleum sulfonates or other such highly effective detergents can be employed. An excellent surfactant is a sodium salt of nonphenyl-sulfonate. Squeegies may be employed by forcing the belt to pass through closed sides of the pan if desired. Simple disinfectants comprise the usual highly effective disenfectants containing nascent oxygen, like hydrogen peroxide or the like: It is ordinarily economically advantageous to employ more stable, more economical, longer term disinfectants such a phenol, Pine Sol disinfectants or other disinfectants that are soluble or at least dispersable in water. Squeegie action may be formed by compressive fit of the top and lip of the pan against the effluent belt such that the liquid is squeezed from the belt to roll back into the pan. As illustrated, the pan preferably includes a top 57 that has at edge 59 a lip that engages the lip of the pan to squeegie the belt at both entering and leaving ends. This allows pulling a vacuum.

The cleaning pan may be formed of any material, such as galvanized metal or plastic. Preferably, a thermoplastic material will be employed to eliminate difficulties with corrosion. Suitable plastics include polyethylene, polypropylene and the more expensive, but more easily worked plastic, such as acrylonitrile butadiene styrene copolymer (ABS).

The top of the pan enables containing the steam long enough for it to do its disinfecting job, cleaning job, and condense with minimal escaping into the room. The steam from the steam passageways 37 will pass through fixed jets, or apertures, within the respective perforate roller 45. Roller 45 may comprise a perforate plastic roller such as a foraminous plastic, that is journalled for rotation about the conduit serving as the steam passageway 47. The steam jets may comprise merely apertures in the laterally extending portion of the conduit 37 interiorly of the perforate roller 45. In this way, the steam will be blasted downwardly toward the belt 29 that rolls contiguously to the roller 45. The cleaning action of the steam is in addition to the cleaning action of the surfactant and the disinfectant action of any solution in the pan.

The exit roller 47 may also be a perforate roller. Warm dry air is injected for efficient drying. On the other hand, if desired, the conduit 61 may be connected to a vacuum pump or the like for withdrawing the uncondensable steam, or other gases.

A drain 63 is provided in the cleaning pan 35 for draining off liquids. If only steam is employed, without any cleaning or disinfectant solutions, the drain 63 keeps liquids and the like drained from the pan. If a vacuum is used, the drain 63 may be connected with a source of vacuum. In any event, this draining of any such contaminating liquids coacts with the steam to produce a sterile belt. As illustrated, the pan has lips that engage the belt in a squeegie action at the effluent end and allow smooth incoming operation at the inlet to the pan 35. As can be seen, the steam passageways are disposed such that any wastes or liquids that are formed fall off the belt interiorly of the cleaning pan 35 as the belt is moved therethrough by the motive means 39.

The motive means 39 is provided for moving the belt such that its top surface passes beneath the perforate bottom 27, contiguously to the scraper 31 and through the cleaning pan 35 adjacent the steam cleaning passageways 37. The motive means 39 includes an animal-powered wheel 65 suspended accessible to the animal and journalled for rotation responsive to locomotion of the animal; and a transducing means 67 for translating the rotation of the wheel 65 into movement of the belt 29.

The wheel 65 may be suspended by any means such as brackets on the bottom of the cage. As illustrated, it is suspended by axle 69 penetrating through the sides 15 and 19 of the cage 11. A ratchet arrangement 71 is provided by a plurality of lathes 73 traversing laterally of the wheel and allowing the wheel to turn in the counter-clockwise direction shown by arrow 75, but encountering a biased member that prevents rotation in the opposite direction. The wheel may comprise any material such as lightweight metal, plastic or the like. Similarly the shaft 69 may comprise metal or plastic. If ingestion of metal is a problem, the shaft is preferably made of plastic, as in the wheel 65 and other accessories.

The transducing means 67 comprises a gear train in the form of the respective intermeshing and coengaging first and second gear 77, 79; and a third gear 81 and connected belt-engaging means 83. The belt-engaging means 83 may comprise a splined cylinder as illustrated or a pair of sprocket wheels that engage respective apertures in the sides of the belt and connected with the shaft 85. The belt-engaging means 83 is preferably made of non-corrosive material such as plastic, although it may be made of other material, such as metal.

Figure 3:
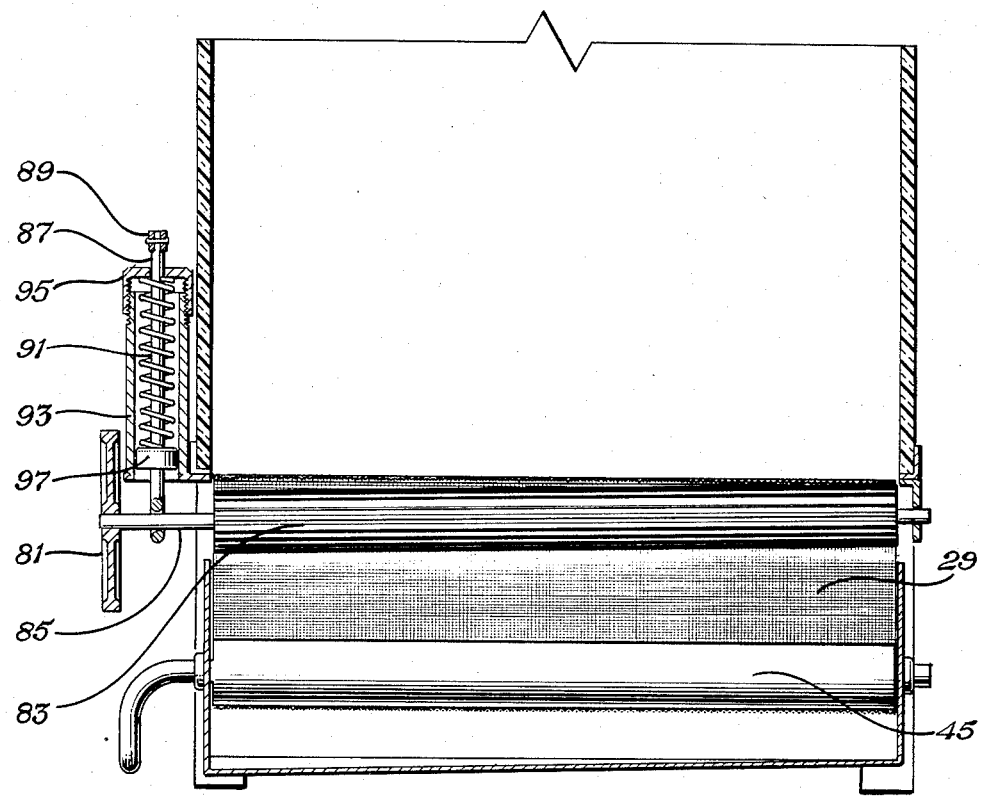
FIG. 3 is a partial cross-sectional view from the end of the cage of one embodiment of this invention.

The third gear is movable to engage the second gear for movement of the belt responsive to locomotion of the animal in the wheel; and to disengage the third gear from the second gear for preventing movement of the belt. As illustrated, the third gear 81 is connected by way of its shaft 85 with a vertical shaft 87, FIG. 3, that is, in turn, connected with a lever arm 89. A biasing means in the form of spring 91 maintains tension on the system.

The first, second and third gears, referred to elsewhere as primary, secondary and tertiary gears can be changed out to demonstrate to the schoolchildren or the like the effects of different gear ratios. In a commercial unit, auxiliary gears are provided with the units to be able to introduce additional ratios as long as the composite diameter number is achieved. For example, typical additional ratio type gears may be employed such as $2+4+6$ to $=12$; a $3+3+6$ to $=12$ or a $4+2+6$ to $=12$ or similar arrangements could be employed.

The spring 91 surrounds the shaft 87 and is contained within the housing 93. It compresses against the top 95, and a flange 97 that is connected with the shaft 87. The fulcrum lever, or lever arm, 89 is connected pivotally with a fulcrum shaft 99. The lever arm 89 is connected with a vertical shaft at its one end 101 and has its other end 103, which may be fixed in an attained position, as by turning of knob 105. As illustrated, the knob 105 will affix the end 103 adjacent indicia 107. The knob may have a threaded sector that engages a nut interiorly of the bracket 109. As illustrated, the fulcrum shaft is intermediate the respective ends on the fulcrum lever, or lever arm, 89. A plurality of apertures 111 and 113 are provided for adjusting the relative lengths of the lever arms to demonstrate the principle of mechanics. The housing 93 may be adjustably positionable also, as the lever arm 89 is moved to accomodate the various apertures in the fulcrum shaft 99. If desired, of course, the fulcrum lever may be pivoted through other arrangements to demonstrate physical principles.

As illustrated, the motive means also includes a supplemental belt driving apparatus 115. While the supplemental belt-driving apparatus may take any form, such as a crank engaging the power roller 51, it is illustrated as a pully 117 drivingly connected as by belt 119 with an electric motor 121. A suitable switch 123 is provided for controlling the electric motor 121.

Signalling means such as the high-intensity light 125 or the speaker 127, or both, may be employed for enabling stimuli to be applied to the animal for teaching and learning.

In operation, the occupant or occupants of the cages are placed thereinto; for example, white mice may be placed in the cage 11. The accessories are assembled in a conventional way. The third gear 81 may be pulled up to engage the first and second gears such that when the animal enters the wheel 65 and walks or runs, the wheel is rotated, rotating the belt moving means 83. Consequently, the belt is moved through the cleaning pan 35. Steam may be passed through the steamcleaning passageways 37 on a continuous or intermittent basis during the cleaning time. The steam may be vented through the steam-cleaning passageways. At a low pressure, small volume amount warm dry air may be injected in or vacuum applied to the conduit 61. The drain 63 drains off liquid, either directly or under vacuum as appropriate. On the other hand, if desired, solenoid operated valves may connect the respective passageways 37, 61 and 63 into, respectively, the steam and either hot air injection or vacuum systems to operate intermittently or when the belt is moved. The cage may be self-cleaned or self-operated intermittently, wherein the solenoid operated valves are energized responsive to either rotation of the wheel 65 as by suitable sensor or by energizing the switch 133 to effect movement of the belt independently of the movement of the animal. Of course, when the switch 123 is energized, the third gear 81 is dropped out of the gear train so that the wheel 65 is not spun so as to cause damage to the small animal.

In any event, as the belt is moved past the scraper, the wastes are removed and the belt is passed adjacent the stream entering through perforate roller 45. The belt passes through any solutions that may be in the cleaning pan 35 and past the perforate roller 47. The hot air dries the belt or the vacuum sucks the moisture from the belt through the perforate roller 47 so that the clean, dry belt passes up through the squeegie lips of the top 57 and the pan 35. The belt is thus cleaned optionally in a self-cleaning mode or in a manual mode.

In addition, the principles of lever arms, translation of rotational means into lineal motion of the belt, and the like are also demonstrated, as are the psychological learning techniques wherein stimuli are applied to the animal and the animal rewarded if it performs in accordance with the stimuli.

From the foregoing it can be seen that this invention achieves the objects delineated hereinbefore and not heretofore provided in the prior art.

Although the invention has been described with a certain degree of particularlity, it is understood that the present disclosure is made only by way of example and that numerous changes in the details of construction and the combination and arrangement of parts may be resorted to without departing from the spirit and scope of the invention, a reference for the latter being had to the appended claims.

What is claimed is:

1. In a cage for small animals or the like having a perforated bottom to allow waste to be dropped by gravity exteriorly of the cage, a continuous periphery of walls extending upwardly from the bottom, at least one of the walls affording a view of the interior of the cage, at least one of the walls adapted at the top thereof to engage a member to form a lid; the improvement comprising:
   a. a continuous closed-loop belt with a portion traversing underneath the perforated bottom to catch the wastes dropped therethrough; said belt traversing over a plurality of rollers beneath said portion and constraining said belt to pass contiguously to a scraper and interiorly of a cleaning pan for cleaning;
   b. said scraper and waste collector disposed adjacent said belt upstream of said pan so as to scrape the wastes from the top surface of said belt before it traverses said cleaning pan;
   c. said cleaning pan disposed downstream of said scraper and adapted to receive liquids condensed on and falling from said belt, said cleaning pan having a drain for draining off said liquids;
   d. steam cleaning passageways traversing laterally across said belt interiorly of said cleaning pan for cleaning said belt such that liquids will collect in said cleaning pan; and
   e. motive means for moving said belt such that its top surface passes beneath the perforate bottom, contiguously to said scraper and through said cleaning pan adjacent said steam cleaning passageways; said motive means including an animal-powered wheel suspended accessible to said animal and journalled for rotation responsive to locomotion of said animal and transducing means for translating said rotation of said wheel into movement of said belt; said wheel having a ratchet to constrain rotation to a single direction and said transducing means including first and second co-engaging gears and a third gear and connected belt engaging means and moving said belt responsive to rotation of said third gear; said third gear being movable to engage said second gear for movement of said belt and to disengage from said second gear to prevent movement of said belt responsive to locomotion of said animal in said wheel.

2. The cage of claim 1 wherein said third gear is connected with a fulcrum lever and moved responsive to movement of said fulcrum lever.

3. The cage of claim 2 wherein said third gear is connected with said fulcrum lever at one end, said fulcrum lever is pivoted at a fulcrum shaft intermediate its end and said fulcrum lever is fastenable at its other end.

4. The cage of claim 3 wherein said fulcrum lever is pivotally mountable at its fulcrum shaft at a plurality of points intermediate its ends for adjusting respective lever arms between said fulcrum shaft and its respective ends.

5. The cage of claim 3 whereby a biasing means keeps tension on said fulcrum lever.

6. The cage of claim 1 wherein said motive means includes supplemental belt driving apparatus for moving said belt as desired regardless of whether or not said animal rotates said wheel.

7. The cage of claim 1 wherein a signalling means is provided for signalling said animal to enable providing stimuli to be applied for teaching and learning.

* * * * *